(12) United States Patent
Jung et al.

(10) Patent No.: US 7,596,393 B2
(45) Date of Patent: Sep. 29, 2009

(54) WEARABLE MOBILE PHONE USING EMG AND CONTROLLING METHOD THEREOF

(75) Inventors: Joon Young Jung, Taejon (KR); Yun Kyung Park, Taejon (KR); Jeun Woo Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1083 days.

(21) Appl. No.: 11/132,333

(22) Filed: May 19, 2005

(65) Prior Publication Data

US 2006/0121958 A1 Jun. 8, 2006

(30) Foreign Application Priority Data

Dec. 6, 2004 (KR) .................. 10-2004-0101875

(51) Int. Cl.
*H04M 1/00* (2006.01)
*A61B 51/117* (2006.01)
(52) U.S. Cl. .................. 455/575.1; 455/575.2; 455/90.1
(58) Field of Classification Search ............. 455/575.1, 455/575.2, 575.3, 90.1, 550.1, 556.1, 556.2; 379/110.01, 90.01; 600/587, 595, 393, 546, 600/549
See application file for complete search history.

(56) References Cited

U.S. PATENT DOCUMENTS

2005/0154593 A1* 7/2005 Denatale ..................... 704/275
2007/0140562 A1* 6/2007 Linderman .................. 382/187

FOREIGN PATENT DOCUMENTS

| KR | 1020030040316 | 5/2003 |
|----|---------------|--------|
| KR | 1020030071684 | 9/2003 |
| KR | 1020040037891 | 5/2004 |

* cited by examiner

*Primary Examiner*—Melur Ramakrishnaiah
(74) *Attorney, Agent, or Firm*—Lowe Hauptman Ham & Berner LLP

(57) ABSTRACT

Disclosed are a wearable mobile phone capable of detecting EMG changed by hand motion of a user and a control method of an input unit of the wearable mobile phone. The wearable mobile phone includes an EMG measuring unit 10 having a plurality of EMG measuring sensors 11 for detecting the EMG changed by hand motion of a user, and made in a ring shape to be worn on a wrist of the user, an EMG transferring unit 20 connected to the EMG measuring unit 10 for transferring the EMG measured by the EMG measuring unit, an EMG determining unit 30 mounted to one side of the EMG transferring unit 20 for receiving EMG from the EMG transferring unit to determine the hand motion and extract an input signal for the mobile phone corresponding to the hand motion, and a mobile phone functioning unit 40 receiving the input signal from the EMG determining unit for functioning the mobile function and having an antenna and a sound transferring device. The wearable mobile phone allows the user to input wanted information related to operation of the mobile phone, without using input keys, which can miniaturize the mobile phone and easily carry the mobile phone.

9 Claims, 4 Drawing Sheets

WEARABLE MOBILE PHONE USING EMG AND CONTROLLING METHOD THEREOF

BACKGROUND OF THE INVENTION

1. Field of the Invention

The present invention relates to a wearable mobile phone using electromyography (hereinafter referred to as EMG), and more particularly, to a wearable mobile phone using EMG capable of measuring hand motion of a user to determine button information to be inputted to the mobile phone and responding to the button information. Also, the present invention relates to a method of controlling an input unit of the wearable mobile phone.

2. Background of the Related Art

At present, mobile phones are generally operated by directly pushing down various keys provided at a front surface of the phone, as shown in FIG. 1.

Since such a mobile phone has a plurality of input keys, there is a limitation on the reduction of a size of the mobile phone. Therefore, it is difficult to design an appearance of the mobile phone.

Meanwhile, since a conventional mobile phone should have standardized input keys to receive information required for operation of the mobile phone, it is not easy to realize a wearable mobile phone, thereby not satisfying the user with high quality of the mobile phone.

SUMMARY OF THE INVENTION

Accordingly, the present invention is directed to a mobile phone that substantially obviates one or more problems due to limitations and disadvantages of the related art.

An object of the present invention is to provide a wearable mobile phone capable of detecting EMG (electromyography) changed by hand motion of a user to allow the user to input wanted information related to operation of the mobile phone, without using input keys, which can miniaturize the mobile phone and easily carry the mobile phone.

Another object of the present invention is to provide a method of controlling an input unit of the wearable mobile phone.

To achieve the object and other advantages, according to one aspect of the present invention, there is provided a wearable mobile phone using electromyography (EMG) comprising: an EMG measuring unit having a plurality of EMG measuring sensors for detecting the EMG changed by hand motion of a user, and made in a ring shape to be worn on a wrist of the user, an EMG transferring unit connected to the EMG measuring unit for transferring the EMG measured by the EMG measuring unit; an EMG determining unit mounted to one side of the EMG transferring unit for receiving EMG from the EMG transferring unit to determine the hand motion and extract an input signal for the mobile phone corresponding to the hand motion; and a mobile phone functioning unit receiving the input signal from the EMG determining unit for functioning the mobile function and having an antenna and a sound transferring device.

According to another aspect of the present invention, there is provided a method of controlling an input unit for a wearable mobile phone using EMG generated by hand motion of a user, the method comprising the steps of: a) receiving the generated EMG; b) determining the hand motion of the user through the EMG to extract an input signal for the mobile phone corresponding to the hand motion; and c) receiving the input signal for the mobile phone to perform a mobile phone function.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 2:
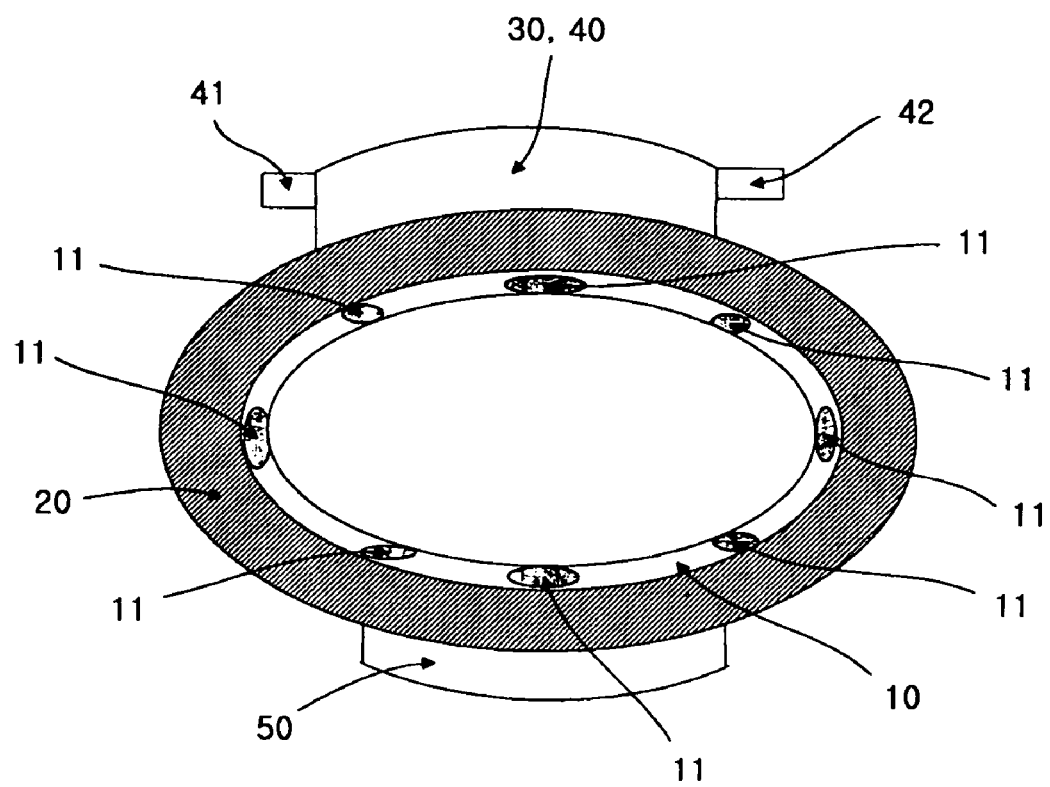
FIG. 2 is a diagram view illustrating a construction of a wearable mobile phone using EMG according to a preferred embodiment of the present invention.

FIG. 2 is a diagram view illustrating a construction of a wearable mobile phone using EMG according to a preferred embodiment of the present invention.

Referring to FIG. 2, the wearable mobile phone according to the present invention includes an EMG measuring unit 10, an EMG transferring unit 20, an EMG determining unit 30, a mobile phone functioning unit 40 and a display (for example, liquid crystal display) 50.

The EMG measuring unit 10 for measuring hand motion using electromyography (EMG) includes a plurality of EMG measuring sensors 11. The present invention is not limited to the number and position of the sensors 11 shown in FIG. 2. The EMGs measured by the EMG measuring sensors 11 are inputted to the EMG determining unit 30 through the EMG transferring unit 20.

The EMG determining unit 30 receives various EMGs from the EMG transferring unit 20 to determine the hand motion of the user and then extract input signal for the mobile phone corresponding to the hand motion. The mobile phone functioning unit 40 receives the input signal for the mobile phone from the EMG determining unit 30 to perform a function of the mobile phone. At that time, the results of the EMG determining unit 30 and the mobile phone functioning unit 40 are displayed on the display 50, so that the user confirms the input of the mobile phone. The function of the mobile phone is realized by the mobile phone functioning unit 40 including an antenna 41 and a wire or wireless sound transferring device 42.

Figure 3:
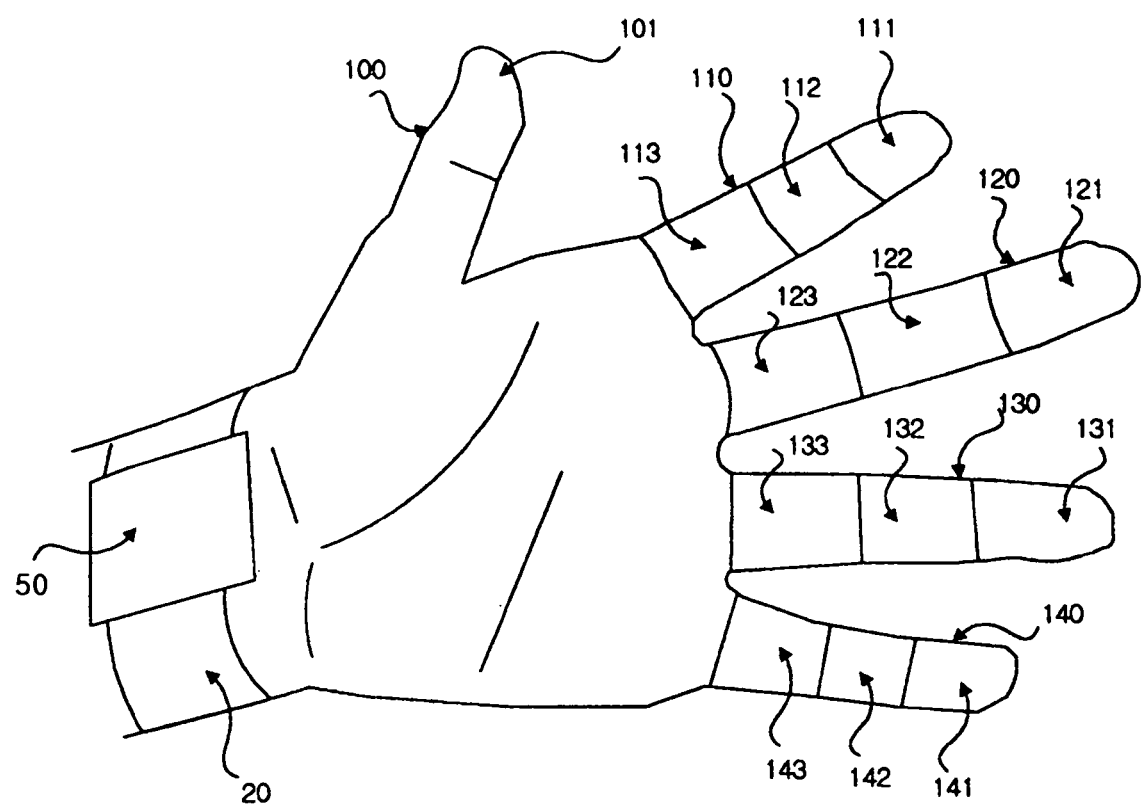
FIG. 3 is a view illustrating an input unit for the wearable mobile phone shown in FIG. 2 which is worn on a hand of a user.

FIG. 3 is a view illustrating an input unit for the wearable mobile phone shown in FIG. 2 which is worn on a hand of a user. The sensors 11 for measuring the EMGs are worn on a wrist of the user under the EMG transferring unit 20, and the display 50 is disposed on the wrist of the user towards a palm of a hand to confirm the result inputted by the hand motion. The EMG determining unit 30 and the mobile phone functioning unit 40 are disposed at a back of the hand. Alternatively, the display 50 and the EMG determining unit 30 may be formed integrally with each other.

Figure 4:
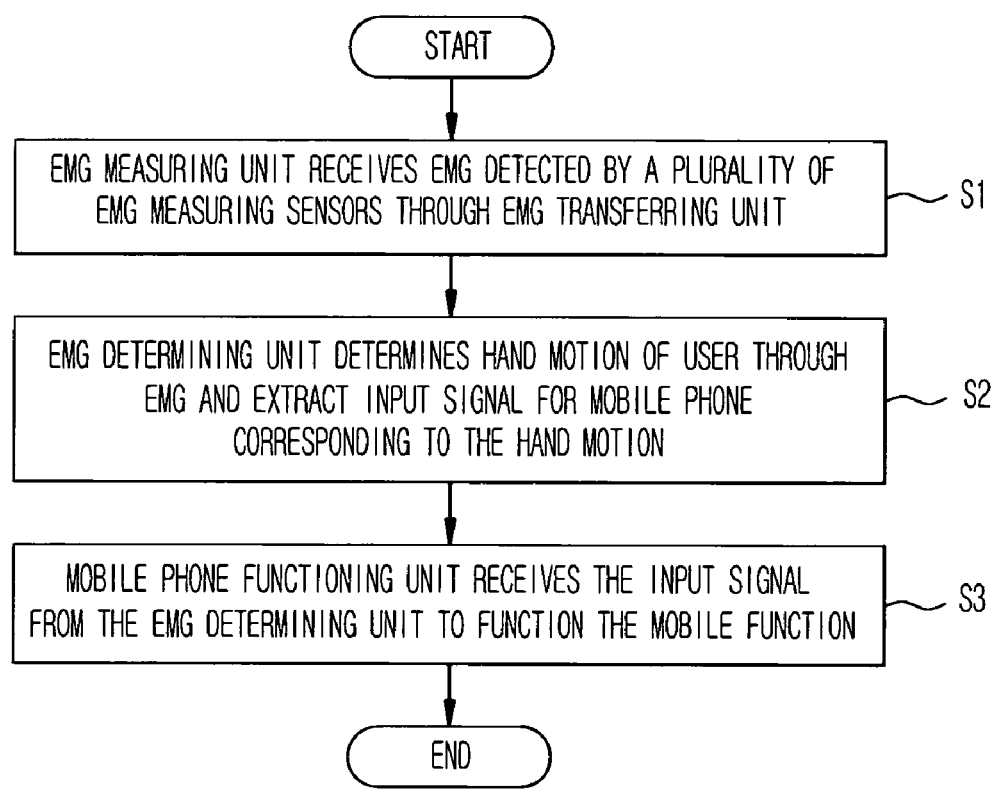
FIG. 4 is a flowchart illustrating a control method of an input unit for a wearable mobile phone according a preferred embodiment of the present invention.

A control method of the input unit for the wearable mobile phone according to the present invention will now be described with reference to FIG. 4. FIG. 4 is a flowchart illustrating the control method of the input unit for the wearable mobile phone according to the present invention.

The EMG determining unit 30 receives various EMGs, which are detected by the EMG measuring sensors 11, from the EMG transferring unit 20 (step S1).

Then, the EMG determining unit 30 determines the hand motion of the user through the various EMGs, and extracts the input signal for the mobile phone corresponding to the hand motion (step S2). Specifically, the step S2 of extracting the input signal for the mobile phone will now be described with reference to FIG. 3 in combination with FIG. 1.

The EMG determining unit 30 determines each finger knuckle pushed down by a tip 101 of a thumb 100 of the user to extract the input signal for the wearable mobile phone. The EMG determining unit 30 determines what the finger knuckle is pushed down by the tip 101 of the thumb, based on the EMG generated at the hand motion. Specifically, when the user pushes down a first knuckle 111 of a middle finger 110 with the tip 101 of the thumb, as shown in FIG. 3, it corresponds to 1 key 211 pushed down by the user shown in FIG. 1. When the user pushes down a second knuckle 112 of the middle finger 110 with the tip 101 of the thumb, it corresponds to 2 key 212 pushed down by the user. And, when the user pushes down a third knuckle 113 of the middle finger 110 with the tip 101 of the thumb, it corresponds to 3 key 213 pushed down by the user. Similarly, each knuckle of the respective fingers 120, 130 and 140 corresponds to 4 to 9 keys 221 to 233, * key 241, 0 key 242, and # key 243 of the mobile phone.

Figure 1:
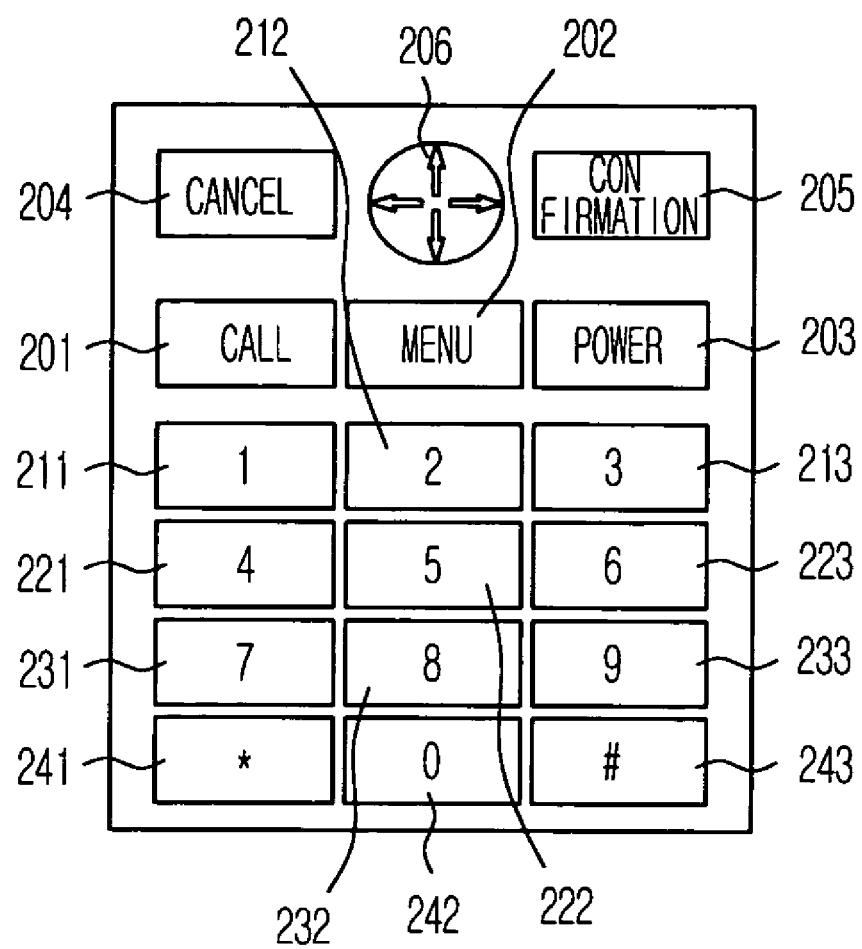
FIG. 1 is a view illustrating input keys of a conventional mobile phone.

As shown in FIG. 1, call key 201, menu key 202, power key 203, cancel key 204, and confirmation key 205 correspond to the motion of the fingers by only bending thumb 100, index finger 110, middle finger 120, ring finger 130, and little finger 140, respectively, with the user's fingers spreading out. Browser key 206 corresponds to the motion of the fingers by only spreading out and moving the thumb 100 up and down, and left and right, with the user's fingers bending. At that time, the designation of the input signals corresponding to the hand motion as described above is merely illustratively shown and described.

After step S2, the mobile phone functioning unit 40 receives the input signal for the mobile phone from the EMG determining unit 30 to perform a function of the mobile phone (steps S3).

With the above description, according to the present invention, the wearable mobile phone can detect EMG (electromyography) changed by the hand motion of the user to allow the user to input wanted information related to operation of the mobile phone, without using input keys, which miniaturizes the mobile phone and easily carries the mobile phone.

The forgoing embodiment is merely exemplary and is not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A wearable mobile phone using electromyography (EMG) comprising:
   an EMG measuring unit having a plurality of EMG measuring sensors for detecting the EMG changed by hand motion of a user, and made in a ring shape to be worn on a wrist of the user;
   an EMG transferring unit connected to the EMG measuring unit for transferring the EMG measured by the EMG measuring unit;
   an EMG determining unit mounted to one side of the EMG transferring unit for receiving EMG from the EMG transferring unit to determine the hand motion and extract an input signal for the mobile phone corresponding to the hand motion; and
   a mobile phone functioning unit receiving the input signal from the EMG determining unit for functioning the mobile function and having an antenna and a sound transferring device.

2. The wearable mobile phone as claimed in claim 1, further comprises a display for displaying a result determined by the EMG determining unit or screen information related to the mobile phone functioning unit.

3. The wearable mobile phone as claimed in claim 1, wherein the EMG determining unit extracts each input signal corresponding to 0 to 9 keys, * key, and # key from the hand motion of the user in which the user pushes down 12 knuckles of an index finger, a middle finger, a ring finger and a little finger by a tip of a thumb.

4. The wearable mobile phone as claimed in claim 1, wherein the EMG determining unit extracts each input signal corresponding to call, menu, power, cancel and confirmation keys from the hand motion of the user in which the user bends a thumb, with other fingers spreading out, bends an index finger, with other fingers spreading out, bends a middle finger, with other fingers spreading out, bends a middle finger, with other fingers spreading out, bends a ring finger, with other fingers spreading out, and bends a little finger, with other fingers spreading out.

5. The wearable mobile phone as claimed in claim 1, wherein the EMG determining unit extracts an input signal corresponding to a browser key from the hand motion of the user in which the user moves a thumb up and down, and left and right.

6. A method of controlling an input unit for a wearable mobile phone using EMG generated by hand motion of a user, the method comprising the steps of
   a) a receiving the generated EMG;
   b) determining the hand motion of the user through the EMG to extract an input signal for the mobile phone corresponding to the hand motion; and
   c) receiving the input signal for the mobile phone to perform a mobile phone function.

7. The method as claimed in claim 6, wherein the step b extracts each input signal corresponding to 0 to 9 keys, * key, and # key from the hand motion of the user in which the user pushes down 12 knuckles of an index finger, a middle finger, a ring finger and a little finger by a tip of a thumb.

8. The method as claimed in claim 6, wherein the step b extracts each input signal corresponding to call, menu, power, cancel and confirmation keys from the hand motion of the user in which the user bends a thumb, with other fingers spreading out, bends an index finger, with other fingers spreading out, bends a middle finger, with other fingers spreading out, bends a middle finger, with other fingers spreading out, bends a ring finger, with other fingers spreading out, and bends a little finger, with other fingers spreading out.

9. The method as claimed in claim 6, wherein the step b extracts an input signal corresponding to a browser key from the hand motion of the user in which the user moves a thumb up and down, and left and right.

* * * * *